US006460258B1

(12) United States Patent
Shimotoyodome

(10) Patent No.: US 6,460,258 B1
(45) Date of Patent: Oct. 8, 2002

(54) SCRIBE DEVICE

(75) Inventor: Gyo Shimotoyodome, Tokyo (JP)

(73) Assignees: Beldex Corporation (JP); THK Co., Ltd. (JP)

( * ) Notice: Subject to any disclaimer, the term of this patent is extended or adjusted under 35 U.S.C. 154(b) by 0 days.

(21) Appl. No.: 09/623,097

(22) PCT Filed: Dec. 28, 1999

(86) PCT No.: PCT/JP99/07366

§ 371 (c)(1),
(2), (4) Date: Aug. 28, 2000

(87) PCT Pub. No.: WO00/41863

PCT Pub. Date: Jul. 20, 2000

(30) Foreign Application Priority Data

Jan. 11, 1999 (JP) ............................................ 11-003840
Jan. 25, 1999 (JP) ............................................ 11-015309

(51) Int. Cl.[7] .............................. B28D 5/00; B43L 13/00
(52) U.S. Cl. ............................... 33/18.1; 83/881; 225/96
(58) Field of Search ........................... 83/881, 879, 880, 83/886, 883, 884; 225/96, 103; 30/164.9, 164.95; 33/18.01, 27.01, 32.1, DIG. 2; 173/210, 211, 212, 162.1

(56) References Cited

U.S. PATENT DOCUMENTS

| 1,684,177 A | * | 9/1928 | Gartin ..................... 173/211 X |
| 1,705,957 A | * | 3/1929 | Braren .................. 30/164.9 X |
| 2,748,750 A | * | 6/1956 | Altschuler ............... 173/162.1 |
| 2,899,934 A | * | 8/1959 | Salengro ................. 173/211 X |
| 3,122,953 A | * | 3/1964 | Atkeson ........................ 83/880 |
| 3,138,875 A | * | 6/1964 | Christensen ............... 30/164.9 |
| 3,271,862 A | * | 9/1966 | Stein et al. ................... 33/18.1 |
| 3,399,586 A | * | 9/1968 | Insolio et al. ................. 83/881 |
| 3,518,907 A | * | 7/1970 | Pinel ........................... 83/886 |
| 3,577,636 A | * | 5/1971 | Detorre ..................... 83/886 X |
| 3,821,910 A | * | 7/1974 | Tjaden ......................... 83/881 |
| 3,880,028 A | | 4/1975 | Frederick, Jr. ............... 83/880 |

(List continued on next page.)

FOREIGN PATENT DOCUMENTS

| EP | 0 260 879 A2 | | 3/1988 | |
| JP | 45-10073 | * | 4/1970 | .................. 83/881 |
| JP | 0136488 | * | 10/1979 | .................. 83/881 |
| JP | 1-110234 | | 7/1989 | |
| JP | 3-264300 | | 11/1991 | |
| JP | 4-223899 | | 8/1992 | |
| JP | 08-020000 | | 1/1996 | |
| JP | 09-025134 | | 1/1997 | |
| JP | 11-157860 | | 6/1999 | |

OTHER PUBLICATIONS

A Finely Controlled Scriber for Fragile Semiconductor Materials, Research Disclosure, No. 183, p. 318–2, Jul. 1979.*

Primary Examiner—Charles Goodman
(74) Attorney, Agent, or Firm—Eugene Stephens & Associates

(57) ABSTRACT

A scribe body (A) includes an abutment member (30) and a vibration generating member (40) for applying vibrations to the abutment member (30). The scribe body (A) is connected to a support portion (6) of a slide mechanism (3) through a vibration damping member (7). Two pairs of vibration damping members (7) are vertically spacedly arranged. The vibration damping members (7) of each pair are arranged on the left and right sides of the scribe body (A). By relatively moving the abutment member (30), which is pressed against a surface of a workpiece by its own weight of the scribe body (A), along the surface of the workpiece while applying vibration, which are generated by the vibration generating member (40), to the abutment member (30), a scribe line is formed in the surface of the workpiece. Vibration of the scribe (A) is damped by the vibration damping member (7).

4 Claims, 5 Drawing Sheets

U.S. PATENT DOCUMENTS

| | | | |
|---|---|---|---|
| 3,967,517 A | * 7/1976 | Bonaddio | 83/880 |
| 3,983,771 A | * 10/1976 | Bonaddio | 83/884 |
| 4,027,562 A | * 6/1977 | Bonaddio | 83/881 |
| 4,220,066 A | * 9/1980 | Hargreaves et al. | 83/886 |
| 4,420,106 A | * 12/1983 | Hyatt | 83/880 X |
| 4,513,649 A | * 4/1985 | Dricot | 83/883 |
| 4,672,874 A | * 6/1987 | Gach | 83/881 |
| 4,679,476 A | * 7/1987 | Abreu | 83/886 |
| 4,726,500 A | * 2/1988 | Rock | 83/886 X |
| 4,756,086 A | * 7/1988 | Yajima et al. | 33/18.1 |
| 4,854,205 A | * 8/1989 | Anderka | 83/881 X |
| 4,862,592 A | * 9/1989 | Richard et al. | 33/18.1 |
| 4,920,495 A | * 4/1990 | Pilkington | 83/881 X |
| 5,094,134 A | * 3/1992 | Mizukoshi | 83/879 X |
| 5,220,858 A | * 6/1993 | Allen et al. | 83/880 |
| 5,454,287 A | * 10/1995 | Fuchigami et al. | 83/881 |
| 5,512,808 A | * 4/1996 | Clark, Jr. et al. | 83/881 X |
| 5,820,006 A | * 10/1998 | Turner | 225/96 |
| 5,860,349 A | * 1/1999 | Takeda | 83/881 |
| 5,944,244 A | * 8/1999 | Lisec | 83/879 X |

\* cited by examiner

SCRIBE DEVICE

TECHNICAL FIELD

This invention relates to a scribe device for forming a scribe line on a surface of a workpiece of brittle material such as a plate glass, ceramics or the like.

BACKGROUND ART

Japanese Patent Non-examined Publication (Kokai) No. H09-25134 discloses a scribe device in which a scribe line is formed on a surface of a workpiece of brittle material by applying vibration thereto so that the workpiece can be broken along this scribe line. In this scribe device, an outside barrel of an air cylinder is fixed to a support portion and an inside barrel of the air cylinder is connected to one end of a piezo actuator. The other end of the piezo actuator is connected with a cutter retaining portion. The cutter retaining portion is slidably attached to the support portion through a slider mechanism. The cutter retaining portion is moved up and down in accordance with expansion and contraction of the piezo actuator and a scribe line is formed on a workpiece by vibration caused by the up and down movement of the cutter retaining portion.

However, such a scribe device has such a problem that resonance is liable to occur and a cutter is sprung up from the workpiece.

In view of the above, the inventor of the present invention had invented a scribe device prior to the present invention, in which a scribe device body is supported by a vibration damping member having resiliency (Japanese Patent Application No. H10-101967). By this, the problem of resonance of the scribe device is solved. However, because all (two) vibration damping members are spacedly arranged in the same direction as viewed from the center of gravity of a scribe body including a body, a holder and a cutter, they are supported in a so-called cantilever fashion. This gives rise to another problem in that the scribe body is swayed (or swung) drawing a circular arc pattern.

DISCLOSURE OF INVENTION

An object of the present invention is to provide a scribe device which is capable of absorbing resonance and which is not swung.

In order to solve the above problems, according to a first aspect of the present invention, there is provided a scribe device comprising a scribe body including an abutment member and a vibration generating member for applying vibrations to the abutment member; and a support portion for supporting the scribe body, wherein the scribe body is supported by the support portion through a pair of vibration damping members, the pair of vibration damping members being arranged in opposing relation in a direction orthogonal to a vibrating direction with the scribe body sandwiched therebetween.

By virtue of the above constitution, since the vibrations transmitted to the scribe body is damped by the vibration damping members which have resilient property, possibility of an occurrence of resonance can be reduced and the abutment member can be prevented from being sprung up from the workpiece, thus enabling to perform a stable scribing operation. Moreover, since the pair of vibration damping members are arranged in opposing relation in a direction orthogonal to the vibrating direction with the scribe body sandwiched therebetween, the scribe body can move back and forth stably without being swung drawing a circular arc pattern.

According to a second aspect of the present invention, there is provided a scribe device having further features, in addition to the features of the first aspect of the present invention, in which a center of gravity of the scribe device is located on or around a plane extending in the vibrating direction passing through a center of the pair of vibration damping member. By virtue of these features, the scribe body can be supported in a more stable manner.

According to a third aspect of the present invention, there is provided a scribe device having further features, in addition to the features of the first aspect of the present invention, in which at least two sets of the pair of vibration damping members are spacedly arranged in the vibrating direction. By virtue of these features, swaying of the scribe body can be prevented in a more reliable manner.

According to a fourth aspect of the present invention, there is provided a scribe device having further features, in addition to the features of the first aspect of the present invention, in which each of the vibration damping member is composed of a plate spring. By virtue of these features, the constitution can be simplified.

According to a fifth aspect of the present invention, there is provided a scribe device having further features, in addition to the features of the fourth aspect of the present invention, in which the plate spring extends not only in a direction orthogonal to the vibrating direction but also in an opposing direction of the pair of plate springs. By virtue of these feature, the moving locus of the scribe body can be more stabilized.

According to a sixth aspect of the present invention, there is provided a scribe device having further features, in addition to the features of the fifth aspect of the present invention, in which a center of the plate spring is fixed to selected one of the scribe body and the support portion and opposite ends thereof are fixed to the other. By virtue of these features, the scribe body can be supported stably.

According to a seventh aspect of the present invention, there is provided a scribe device having further features, in addition to the features of the sixth aspect of the present invention, in which bent portions are formed between the center of the plate spring and the opposite ends of the plate spring. By virtue of these features, the scribe body can be supported such that the scribe body can move in the vibrating direction smoothly.

According to an eighth aspect of the present invention, there is provided a scribe device having further features, in addition to the features of the first aspect of the present invention, in which the scribe device further comprises a slide mechanism, the slide mechanism including a guide and a slider supported by the guide for sliding in the vibrating direction, the slider being provided as the support portion. By virtue of these features, since the slider is movable by vibrations transmitted from the scribe body through the plate spring, a large reaction is not applied to the scribe body, thus enabling to reduce the possibility of an occurrence of resonance to the least possible extent.

According to a ninth aspect of the present invention, there is provided a scribe device having further features, in addition to the features of the first aspect of the present invention, in which the vibrating direction is generally perpendicular so that the abutment member is pressed against a surface of a workpiece by an own weight of the scribe body. By virtue of these features, the abutment member can be pressed by the own weight of the scribe device and without using any special biasing mechanism. Moreover, since a pressing force is applied to the abutment member so that the abutment member is pressed against the surface of the workpiece stably and the abutment member is not sprung up from the workpiece, chips can be prevented from occurring in the nearby area of the scribe line and a scribe line can be formed with a higher degree of precision.

According to a tenth aspect of the present invention, there is provided a scribe device having further features, in addition to the features of the first aspect of the present invention, in which the scribe body further includes a body and a holder supported by the body for sliding in the vibrating direction, the abutment member being retained by an end portion of the holder, the body and holder having receiving portions, respectively, which are in opposing relation in the vibrating direction, a piezo actuator being sandwiched, as the vibration generating member, between the receiving portions, the piezo actuator being cyclically expanded and contracted by being subjected to high frequency voltage, and the holder being biased by the pair of resilient members such that the receiving portion is pressed against the piezo actuator. By virtue of these features, the cyclic expansion and contraction of the piezo actuator can positively be transmitted to the abutment member in the form of vibration. Moreover, since the resilient members apply a pre-load to the piezo actuator, the abutment member can move following the vibratory motion of the piezo actuator and without receiving any affection of the reaction from the workpiece. Thus, a favorable scribing operation can be obtained.

BEST MODE FOR CARRYING OUT THE INVENTION

One embodiment of the present invention will be described hereinafter with reference to the drawings.

Figure 1:
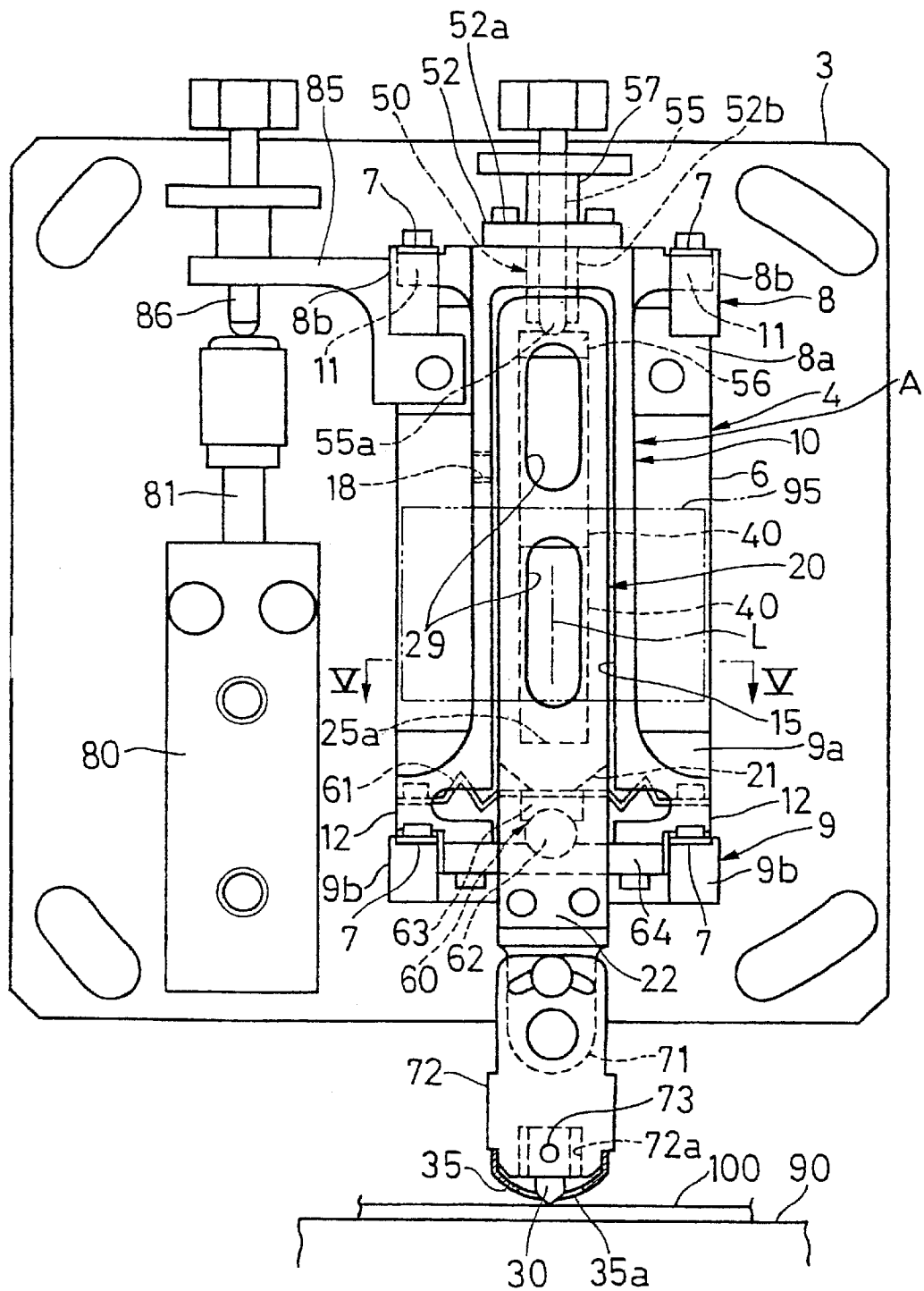
FIG. 1 is a front view of a scribe device according to one embodiment of the present invention.
Figure 2:
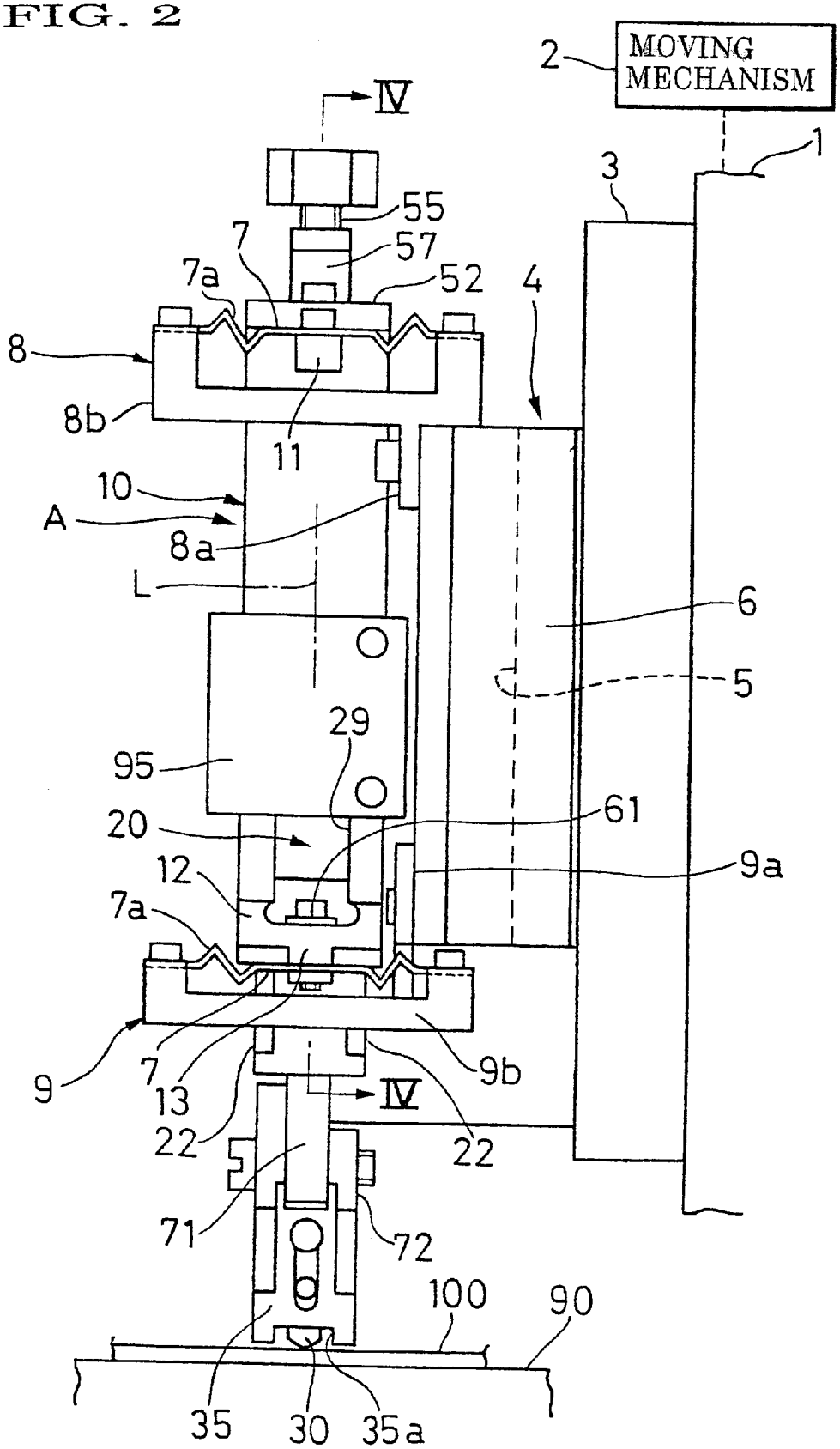
FIG. 2 is a side view thereof.
Figure 3:
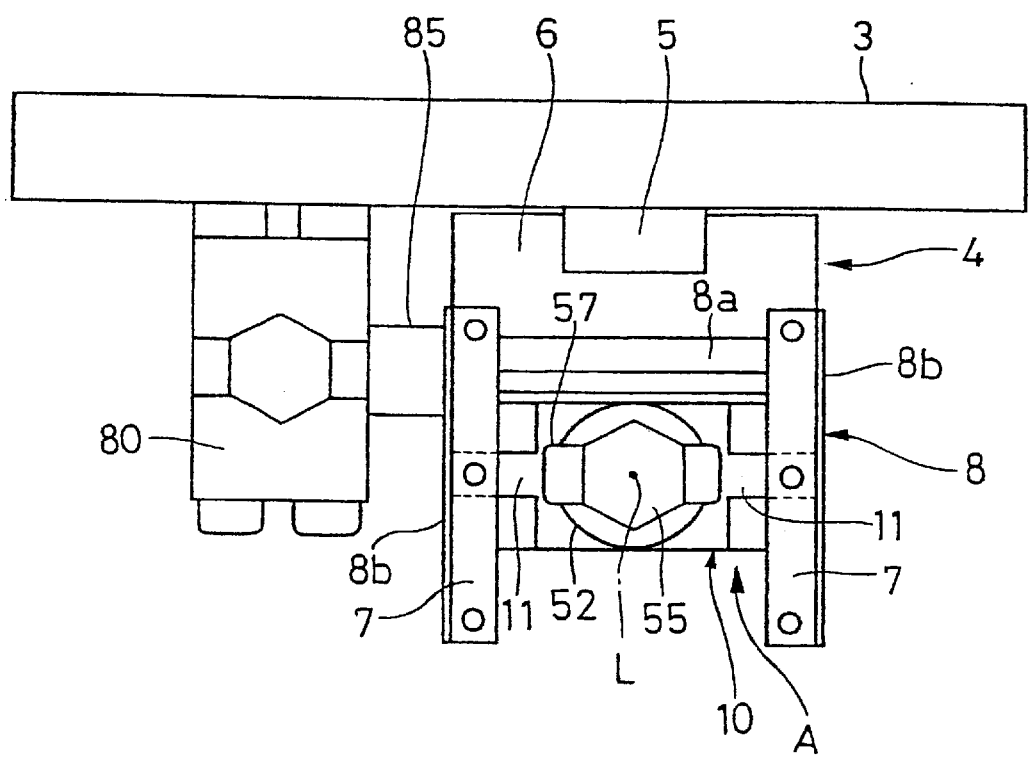
FIG. 3 is a plan view thereof.

As shown in FIGS. 1 to 3, a scribe device comprises a moving base 1 (support table, shown only in FIG. 2), a moving mechanism 2 (shown only in FIG. 2) for moving the moving base 1 in a horizontal direction, a slide mechanism 4 attached to the moving base 1 through a base plate 3 and a scribe body A vertically movably supported by the slide mechanism 4. This slide mechanism 4 includes a body 10, a holder 20 supported by the body 10 such that the holder 20 can slightly slide in a vertical direction, a cutter 30 (head, abutment member) disposed at a lower end of the holder 20 and two piezo actuators 40 (vibration generating members) for applying a vertical vibration to the holder 20.

The moving mechanism 2 moves the moving base 1 horizontally in a left and right direction in FIG. 1 and in a direction orthogonal to a paper surface in FIG. 2.

The slide mechanism 4 includes a guide 5 fixed to the base plate 3 and a slider 6 slidably supported by the guide 5 for sliding in a vertical direction. The slider 6 is limited its lowermost position by a stopper (not shown) disposed on the guide 5.

The body 10 is supported by slider 6 through four plate springs 7 (vibration damping members having resiliency). This will be described hereinafter in detail.

Figure 6:
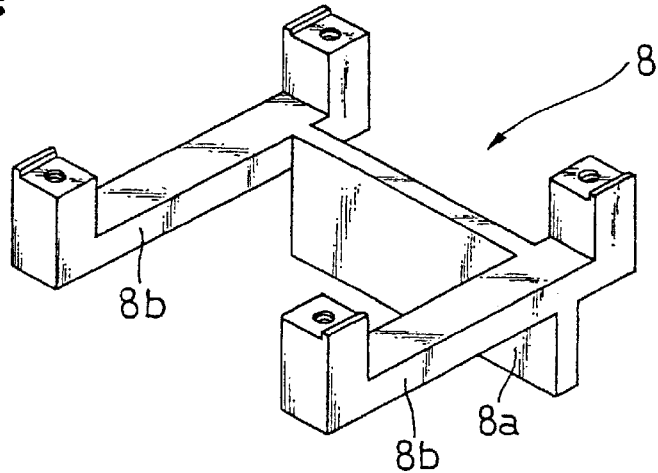
FIG. 6 is a perspective view showing an upper bracket for supporting a damping plate spring.

Brackets 8, 9 are fixed to an upper and a lower end portion of the slider 6, respectively. The upper bracket 8, as shown in FIG. 6, includes a plate-like attachment portion 8a fixed to the slider 6, and U-shaped spring fixing portions 8b disposed at a left and a right side of the attachment portion 8a and extending forward. As best shown in FIG. 2, opposite ends of the plate spring 7 extending in a back and forth direction are fixed to upper surfaces of front and rear ends of the spring fixing portions 8b.

Figure 7:
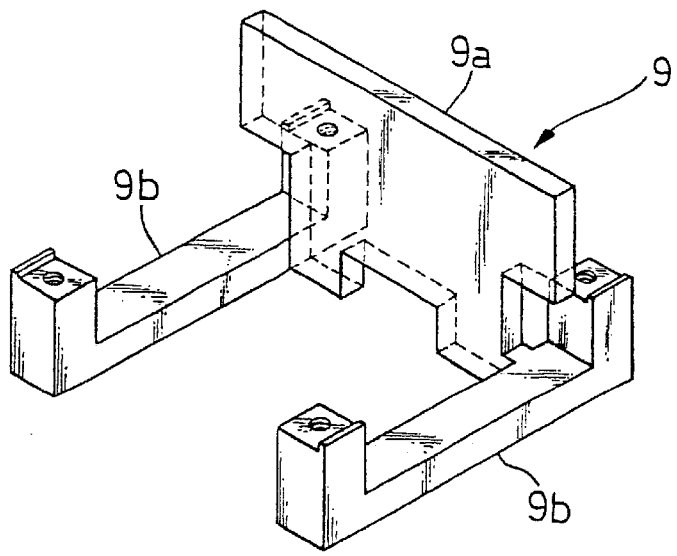
FIG. 7 is a perspective view showing a lower bracket for supporting a damping plate spring.

The lower bracket 9, likewise, includes an attachment portion 9a, and one pair of left and right spring fixing portions 9b (see FIG. 7). The opposite ends of the plate spring 7 extending in a back and forth direction are fixed to upper surfaces of front and rear ends of the spring fixing portions 9b (see FIG. 2).

On the other hand, the body 10 exhibits a vertically elongated box-like configuration. The body 10 are formed with spring fixing portions 11 projecting from a left and a right side surface of an upper end portion thereof. The one pair of upper plate springs 7 are fixed at centers thereof to the upper surfaces of the spring fixing portions 11, respectively.

Expanded portions 12 expanding leftward and rightward are formed on a lower end portion of the body 10. The spring fixing portions 13 are formed, in their projected fashions, on lower surfaces of the centers of the expanded portions 12 in the back and forth direction, respectively. Each lower plate spring 7 is fixed at the center to each spring fixing portion 12.

The four plate springs 7 are arranged with their surfaces held horizontal (orthogonal to the vibrating direction) in the manner as described above. Moreover, the paired plate springs 7 are arranged at a same height and in opposing relation in a left and right direction (orthogonal direction to the vibrating direction) with the body 10 sandwiched therebetween. Each plate spring 7 extends in a back and forth direction (orthogonal not only to the vibrating direction but also to the opposing direction of the paired plate springs 7).

Each of the four plate springs 7 has a bent portion 7a between the fixing area at the center and the fixing areas at opposite ends.

A vertically long receiving space 15 is defined within the body 10 such that front and lower sides of the body 10 are open. The body 10 exhibits a generally U-shaped configuration in cross section. The holder 20 is received in the receiving space 15.

The holder 20 has a vertically extending elongated box-like configuration. A receiving space 25 is defined within the holder 20 such that a rear side of the holder 20 is open. The holder 20 exhibits a generally U-shaped configuration in cross section. The holder 20 is coaxial with the body 10. The center co-axis of the body 10 and holder 20 is indicated by L in the illustration.

Figure 4:
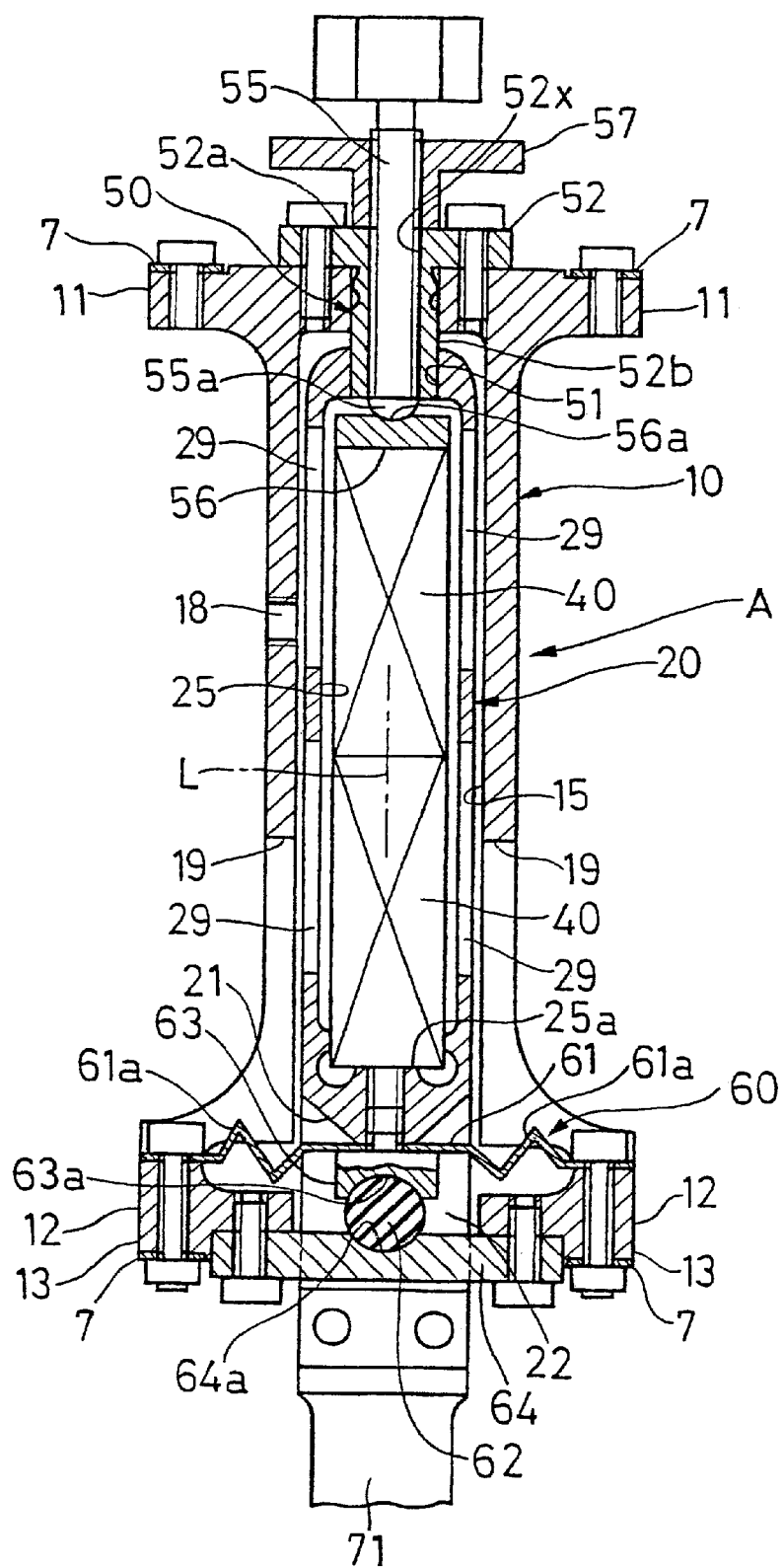
FIG. 4 is a vertical sectional view, taken on line IV—IV of FIG. 2, of the above scribe device.
Figure 5:
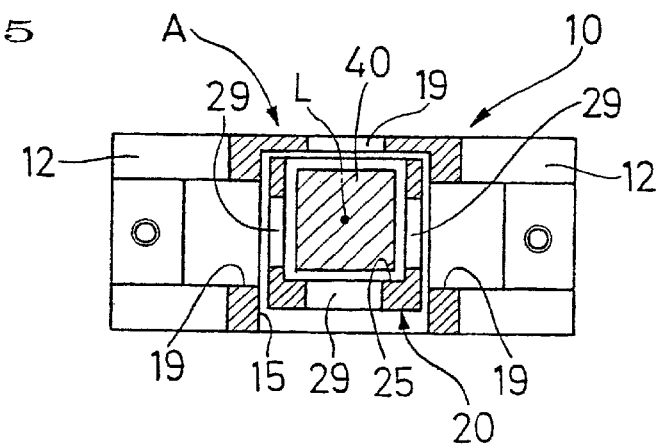
FIG. 5 is a cross sectional view, taken on line V—V of FIG. 1, of the above scribe device.

As best shown in FIGS. 4 and 5, two piezo actuators 40 are received in the receiving space 25 of the holder 20 such that the piezo actuators 40 are coaxial with the body 10 and the holder 20. Each actuator 40 is elongated and exhibits a square configuration in section. The actuators 40 generate vibrations in the axial direction. The two piezo actuators 40 are directly connected together. A lower end face of the lower piezo actuator 40 is in abutment with a bottom surface 25a (abutment portion) of the receiving space 25 of the holder 20.

An attachment hole 18 is formed in a left side wall of the body 10. A nozzle (not shown) is connected to the attachment hole 18. Air from the nozzle enters the receiving space 15 and then flows into receiving space 25. The air flowed into the receiving space 25 is jetted to the piezo actuators 40 to cool them. The body 10 has holes 19 which are formed in left and right walls and a rear wall thereof, whereas the holder 20 has holes 29 which are formed in left and right walls and a front wall thereof. Those holes serve as air passages and air-jetting ports.

The holder 20 is supported on the body 10 by a support mechanism such that the holder 20 can slightly move in a direction (vibrating direction) along the center axis L. The support mechanism comprises a first support portion 50 disposed above the piezo actuators 40 and a second support portion 60 disposed under the piezo actuators 40.

The first support portion 50, as shown in FIG. 4, comprises a slide hole 51 having a circular configuration in section which is formed all the way through an upper wall of the holder 20 and a guide member 52 mounted on an upper wall of the body 10. The guide member 52 includes an attachment portion 52a having a plate-like configuration and fixed to an upper end face of the body 10 and a cylindrical portion 52b projecting downward from the attachment portion 52a. The cylindrical portion 52b extends through the upper wall of the body 10 and is inserted into the slide hole 51 only with a slight clearance. By this, the upper end portion of the holder 20 is slidably supported by the body 10. Since the slide hole 51 and the cylindrical portion 52b of the guide member 52 are coaxial with the body 10, the sliding direction of the holder 20 is coincident with the vibrating direction of the piezo actuators 40.

A screw hole 52x is formed in the guide member 52. An adjustment screw 55 for exhibiting an adjusting function as later described, is threadingly engaged with the screw hole 52x. A lower end portion 55a of the adjustment screw 55 is in abutment with an upper end face of the upper piezo actuator 40 through a receiving plate 56 and offered as an abutment portion of the body 10. The lower end portion 55a of the adjustment screw 55 is in the form of a convex spherical surface and fittingly contacted with a receiving seat 56a consisting of a concave spherical surface of the receiving plate 56.

The lower end portion 55a of the adjustment screw 55 is opposed to the bottom surface 25a of the receiving space 25 of the holder 20 in a vertical direction (direction along the center axis L). The piezo actuators 40 are arranged in such a manner as to be sandwiched between the lower end portion 55a the bottom surface 25a.

The adjustment screw 55 is threadingly engaged with a lock nut 57 for fixing the adjustment screw 55.

A second support portion 60, as shown in FIG. 4, comprises a plate spring 61 as a resilient member and a spherical ball 62 made of resilient material such as rubber, resin or the like.

The plate spring 61 is fixed at its opposite ends to an upper surface of the expanded portion 12 of the body 10 and at its center to a lower end face of the spring fixing portion 21 by a screw 63. The spring fixing portion 21 is formed on the holder 20 and tapered such that it is reduced in thickness towards its tip. The spring fixing portion 21 and the center of the plate spring 61 are arranged on the center axis L of the body 10, the holder 20 and the piezo actuators 40.

The plate spring 61 has a bent portion 61a between the center fixing area and the opposite ends fixing areas.

The ball 62 is interposed between a head portion of the screw 63 and the receiving plate 64. The receiving plate 64 is fixedly bridged between lower end faces of the left and right expanded portions 12 of the body 10. The head portion and the receiving plate 64 are formed with receiving seats 63a, 64a, respectively, which are in the form of concave spherical surfaces, respectively. The ball 62 is fitted between the receiving seats 63a, 64a. The screw 63, the center of the receiving plate 64 and the ball 62 are arranged on the center axis L of the piezo actuators 40, etc.

An attachment structure of the cutter 30 will now be described. The holder 20 is bifurcated into one pair of extension portions 22. The one pair of extension portions 22 extend downward from the fixing portion 21. The plate spring 61, the ball 62 and the receiving plate 64 are arranged between the extension portions 22.

A first attachment 71 is connected to lower end portions (distal end portions) of the extension portions 22 of the holder 20. A second attachment 72 is connected to the first attachment portion 71 such that the angle of connection can be adjusted. A lower surface of the second attachment 72 is formed with a receiving hole 72a. The cutter 30 is received in this receiving hole 72a and removably fixed thereto by a screw 73.

The cutter 30 is disposed on the center axis L of the piezo actuators 40. A lower end (distal end) of the cutter 30 has a conical shape and is sharpened. A pyramidal diamond grain is secured to the lower end of the cutter 30. A vertex of the diamond grain faces downward so as to contact a plate glass 100 (workpiece) as later described.

A guide plate 35 is attached to the attachment 72. The guide plate 35 is composed of a U-shaped spring and is fixed to opposite side surfaces of the attachment 72.

As shown in FIGS. 1 and 2, a hole 35a is formed in a central portion of the guide plate 35. The lower end of the cutter 30 projects downward a prescribed amount from the guide plate 35 through the hole 35a.

The body 10, the holder 20, the cutter 30 and the piezo actuators 40 have a common center axis L. This center axis L and the centers of the four plate springs 7 are arranged on a same vertical plane. Since the scribe body $\underline{A}$ comprises, as chief component elements, the body 10, the holder 20, the cutter 30 and the piezo actuators 40, the vertical axis (line extending along the vibrating direction) passing the weight of the scribe body $\underline{A}$ is either in alignment with the center axis L or located at its nearby area. Accordingly, it can be said that the vertical axis passing the weight of the scribe body $\underline{A}$ is located on an almost same vertical plane as the centers of the four plate springs 7. In other words, the weight of the scribe body $\underline{A}$ is located either on the vertical plane (plane extending in the vibrating direction) passing the centers of the four plate springs 7 or at its nearby area.

As shown in FIGS. 1 and 3, an air cylinder 80 (pushup mechanism) is vertically attached to the base plate 3. On the other hand, an L-shaped bracket 85 is fixed to a side surface of the body 10. A vertical short rod 86 is threadingly engaged with the bracket 85. The short rod 86 and an upper end of a rod 81 of the air cylinder 80 are in opposing relation.

Operation of the scribe device thus constructed will now be described. When the adjustment screw 55 is screwed, the piezo actuators 40 and the holder 20 are moved downward. In accordance with this downward movement, a downward force is exerted to the plate spring 61 through the spring fixing portion 21. A downward force is also exerted to the ball 62 through the screw 63. Since the plate spring 61 is fixed at its opposite ends to the expanded portions 12 of the body 10, the plate spring 61 is resiliently deformed by the downward force. Since the ball 62 is retained by the receiving plate 64 fixed to the body 10, it is resiliently compression-deformed. A resilient restoring force of the plate spring 61 and ball 62 serves as a force for biasing the holder 20 upward with respect to the body 10. As a consequence, the bottom surface 25a of the receiving space 25 of the holder 20 is biased towards the piezo actuators 40 and a pre-load (force in a direction for axially compressing the piezo actuators 40) is applied to the piezo actuators 40 sandwiched between the bottom surface 25a and the lower end portion 55a of the adjustment screw 55.

As the screwing amount of the adjustment screw 55 is increased, the pre-load applied to the piezo actuators 40 is increased. After the pre-load adjustment using the adjustment screw 55 is finished, the lock nut 57 is tightened to prevent the adjustment screw 55 from getting loosened.

A scribe line is formed on the plate glass 100 (workpiece) set on a horizontal installation table 90 using the scribe device which has been subjected to pre-load adjustment treatment. At an initial stage, the cutter 30 of the scribe device is horizontally away from the edge of the plate glass 100 and located in the lowermost position (position corresponding to the lowermost position of the slider 6). In that state, when the moving mechanism 2 is driven to cause the moving base 1 to move in a horizontal direction, the body 10, the holder 20 and the cutter 30 move in the same direction altogether. Then, the guide plate 35 attached to the holder 20 is brought into abutment with the edge of the plate glass 100 and the cutter 30 is guided onto an upper surface of the plate glass 100 by the guide plate 35.

As mentioned above, a pressing force is normally exerted to the cutter 30 with respect to the upper surface of the plate glass 100, with the cutter 30 placed on the upper surface of the plate glass 100. This pressing force is attributable from their own weights of the body 10, the holder 20, the slider 6, etc. The pressing force can be adjusted by removably attaching a weight 95 to the body 20.

A scribing operation is practiced with the cutter 30 pressed against the surface of the plate glass 100 by their own weights of the body 10, etc., as described above. Specifically, the moving base 1 is moved by the moving mechanism 2 to cause the cutter 30 to move along the plate glass 100. And a high frequency voltage is supplied to the piezo actuators 40 to cause the piezo actuators 40 to be cyclically expanded and contracted in the axial direction. Then, vibration of the holder 20 caused by the cyclic expansion and contraction of the piezo actuators 40 is transmitted to the plate glass 100 through the cutter 30. As a consequence, a scribe line having a deep vertical crack can be formed. However, since the pressing force attributable to their own weights of the body 10, etc. is comparatively small, a horizontal crack, which would otherwise occur as in the conventional devices, hardly occurs.

In this embodiment, two piezo actuators 40 are linearly connected together and a synchronized high frequency voltage is supplied thereto so that vibrations having a double amplitude can be generated, compared with the case in which only one piezo actuator 40 is employed. Owing to this feature, a scribe line having a sufficient depth can be formed in the case where the plate glass 100 has a large thickness.

The frequency of the high frequency voltage supplied to the piezo actuators 40 is set to about 3 to 30 KHz depending on material, hardness, thickness, etc. of the plate glass 100.

In the process for forming a scribe line, the cutter 30 is normally contacted with the surface of the plate glass 100 by the pressing force attributable to their own weights of the body 10, etc. Since the cutter 30 is never moved away, even in an instant, from the surface of the plate glass 100, chips can be prevented from occurring in the nearby area of the scribe line and a beautiful scribe line can be formed. Since the holder 20 is a rigid body and the cutter 30 is attached to the holder 20 without a provision of any resilient body as an intermediate member, the cutter 30 is vibrated in unison with the holder 20 and the vibration energy of the piezo actuators 40 can be transmitted to the cutter 30 in a desirable condition.

Since, in this embodiment, the piezo actuators 40 and the holder 20 are coaxial and the cutter 30 is located on the center axis L thereof, the vibration of the piezo actuators 40 can be transmitted to the cutter 30 efficiently.

As described above, since the piezo actuators 40 are incurred with a pre-load by the resilient restoring force of the plate spring 61 and the ball 62, the vibration of the abutment member can be caused in accordance with expansion and contraction of the piezo actuators 40 in a favorable manner without being affected by reaction of the workpiece and a scribing operation can be carried out under a stable vibration.

The plate spring 61 and the ball 62, as mentioned above, have both the roles for applying a pre-load to the piezo actuators 40 and for resiliently supporting the holder 20.

The ball 62 has an additional role for avoiding resonance and preventing the cutter 30 from being sprung up from the plate glass 100. The plate spring 61 has an additional role for stopping the rotation of the holder 20.

Although the plate spring 61 is fixed at the opposite ends, it includes the bent portion 61a between the fixed place at the center and the fixed places at the opposite ends. Accordingly, the vertical positional adjustment of the holder 20 by means of the adjustment screw 55 and vibration of the holder 20 are facilitated.

Since, in this embodiment, the plate spring 7 is interposed between the scribe body A and the slider 6, the vibration transmitted to the body 10 from the vibration actuators 40 is damped. Accordingly, the possible occurrence of a resonance can be further lessened, the cutter (abutment member) 30 can be prevented from being sprung up from the workpiece 10 and a stable scribing operation can be performed.

Since the slider 6 is movable by the vibration transmitted from the body 10 through the plate spring 7, a large amount of reaction force is not applied to the body 10. Accordingly, the possible occurrence of a resonance can be minimized.

Moreover, since the plate spring 7 includes the bent portion 7a, a relative moving amount of the body 10 with respect to the slider 6 can be increased and therefore, damping of vibration can be performed more favorably.

Furthermore, since the four plate springs 7 are arranged, in the form of one pair, on the left and right sides of the scribe body A and in addition, at least two sets of the paired plate springs 7, which are vertically spacedly arranged, are employed, the scribe body A is supported by the slider 6 stably and the back and forth movement (vibration) of the scribe body A is made along the vibration axis of the actuators 40 (center axis L of the body 10) without allowing the scribe body A from being swung drawing a circular arc pattern. Thus, the scribing operation can be performed stably from this respect as well.

Moreover, since the center of gravity of the scribe body A is arranged on or around the vertical plane passing through the centers of the four plate springs 7, the scribe body A can be supported stably from this respect as well.

When the operation for forming the scribe line on the plate glass 100 using the cutter 30 is finished, the supply of power to the piezo actuators 40 is stopped and the air cylinder 80 is actuated to push up the body 10 to move the cutter 30 away from the workpiece 100. Then, the plate glass 100 is removed from the installation table 90. Thereafter, the moving base 1 is return to its original position and the air cylinder 80 is actuated in the opposite direction so that the state of FIG. 1 is realized, in other words, the air cylinder 80 is brought back to the state in which the upper end of the rod of the air cylinder 80 is located away from the short rod 86. By doing so, the body 10 is returned to its lowermost position.

The plate glass 100 with the scribe line formed thereon in the above-mentioned manner is broken along the scribe line by a breaking apparatus, not shown.

It should be noted that the present invention is not limited to the above embodiment and many changes and modifications can be made. For example, it is accepted that an air cylinder is indirectly fixed to the support table 1 and a distal end of its rod is connected to or abutted with the slider 6. By this air cylinder, the slider 6 or the body 10 is biased towards the surface of a workpiece. It is also accepted that the body 10 and the holder 20 of FIG. 1 are arranged horizontally and a scribing operation is performed with respect to a vertical surface of a workpiece.

It is also accepted that instead of horizontally moving the support table 1 which supports the body 10, it is fixedly secured to a prescribed position and the moving mechanism 2 is connected to the installation table 90 so that the plate glass 100 placed on the installation table 90 is moved.

Although, in the above-mentioned embodiment, a cutter having a conical or pyramidal configuration is employed, a disc-like cutter may be employed. In the case where a disc-like cutter is employed, a part of a peripheral edge of the cutter is provided as a sharpened tip which is brought into abutment with a workpiece.

In the above embodiment, although the opposite ends of the plate spring are fixed to the slider and the center thereof is fixed to the body, it is accepted that the opposite ends of the plate spring are fixed to the body and the center thereof is fixed to the slider. It is also accepted that one of the vertically arranged plate springs is fixed at its opposite ends to the slider and at its center to the body and the other is fixed at its opposite ends to the body and at its center to the slider.

In the above embodiment, although two sets of the paired left and right plate springs are arranged in vertical relation, three or more sets may be employed. Particularly, in the case where the vibrating direction is the vertical direction, only one set may be employed.

What is claimed is:

1. A scribe device comprising a scribe body (A) including an abutment member (30) and a vibration generating member (40) for applying vibrations to said abutment member; and a support portion (6) for supporting said scribe body, wherein said scribe body (A) is supported by said support portion (6) through first and second pairs of plate springs (7), said first pair of plate springs being spaced apart from said second pair of plate springs in a vibrating direction with said scribe body sandwiched therebetween, said plate springs of each pair of plate springs being spaced apart in a first direction orthogonal to said vibrating direction;

wherein each of said plate springs extends in a second direction orthogonal to both said vibrating direction and said first direction;

wherein a center of each of said plate springs is fixed to a selected one of said scribe body and said support portion and opposite ends of each of said plate springs are fixed to the other of said scribe body and said support portion; and wherein a center of gravity of said scribe body is located on or around a plane extending in said vibrating direction passing through said centers of the plate springs; said scribe body including a holder for the abutment member biased by a resilient member wherein said resilient member comprises a third plate spring (61), said third plate spring extending in the first direction.

2. A scribe device according to claim 1, wherein said portions (7*a*) are formed between the center and the opposite ends of each said plate spring.

3. A scribe device according to claim 1, further comprising a slide mechanism (4), said slide mechanism including a guide (5) and a slider (6) supported by said guide for sliding in the vibrating direction, said slider being provided as said support portion.

4. A scribe device according to claim 1, wherein the vibrating direction is generally perpendicular so that said abutment member (30) is pressed against a surface of a workpiece by an own weight of said scribe body (A).

* * * * *

UNITED STATES PATENT AND TRADEMARK OFFICE
CERTIFICATE OF CORRECTION

PATENT NO. : 6,460,258 B1
DATED : October 8, 2002
INVENTOR(S) : Gyo Shimotoyodome It is certified that error appears in the above-identified patent and that said Letters Patent is hereby corrected as shown below:

Column 10,
Line 35, after "wherein" delete "said" and substitute therefor -- bent --.

Signed and Sealed this

Twentieth Day of May, 2003

JAMES E. ROGAN
*Director of the United States Patent and Trademark Office*